US008828515B2

(12) United States Patent
Dan-Jumbo et al.

(10) Patent No.: US 8,828,515 B2
(45) Date of Patent: Sep. 9, 2014

(54) PREDICTABLE BONDED REWORK OF COMPOSITE STRUCTURES USING TAILORED PATCHES

(71) Applicant: The Boeing Company, Chicago, IL (US)

(72) Inventors: Eugene A. Dan-Jumbo, Bothell, WA (US); Russell L. Keller, Maple Valley, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/902,816

(22) Filed: May 26, 2013

(65) Prior Publication Data

US 2013/0337214 A1 Dec. 19, 2013

Related U.S. Application Data

(62) Division of application No. 12/400,519, filed on Mar. 9, 2009, now Pat. No. 8,449,703.

(51) Int. Cl.
*B29C 73/10* (2006.01)
*B64C 1/06* (2006.01)
*B29L 31/30* (2006.01)

(52) U.S. Cl.
CPC . *B64C 1/06* (2013.01); *B29C 73/10* (2013.01); *B29L 2031/3076* (2013.01)
USPC .............. 428/64.1; 156/98; 428/63; 428/212; 428/214; 428/218

(58) Field of Classification Search
CPC ........................................ B29C 73/10

USPC ........ 156/94, 98; 428/63, 64.1, 212, 214, 218
See application file for complete search history.

(56) References Cited

U.S. PATENT DOCUMENTS

| 3,995,080 A | 11/1976 | Cogburn et al. |
| 4,352,707 A | 10/1982 | Wengler et al. |
| 4,497,404 A | 2/1985 | Lowrance |
| 4,588,626 A | 5/1986 | Cologna et al. |
| 4,808,253 A | 2/1989 | Mimbs |
| 4,820,564 A | 4/1989 | Cologna et al. |
| 4,824,500 A | 4/1989 | White et al. |

(Continued)

FOREIGN PATENT DOCUMENTS

| EP | 1775445 A2 | 4/2007 |
| EP | 1972429 A2 | 9/2008 |

(Continued)

OTHER PUBLICATIONS

Office Action, dated Jan. 5, 2012, regarding U.S. Appl. No. 12/400,519, 21 pages.

(Continued)

*Primary Examiner* — Jeff Aftergut
*Assistant Examiner* — Jaeyun Lee
(74) *Attorney, Agent, or Firm* — Yee & Associates, P.C.

(57) ABSTRACT

A patch for reworking an inconsistent area in a composite structure includes a composite laminate patch and a layer of adhesive for bonding the laminate patch to the composite structure. The laminate patch has at least first and second regions for releasing strain energy around the inconsistent area respectively at different rates.

20 Claims, 8 Drawing Sheets

(56) References Cited

U.S. PATENT DOCUMENTS

| | | | |
|---|---|---|---|
| 4,858,853 | A | 8/1989 | Westerman et al. |
| 4,912,594 | A | 3/1990 | Bannink et al. |
| 4,916,880 | A | 4/1990 | Westerman, Jr. |
| 4,961,799 | A | 10/1990 | Cologna et al. |
| 4,967,799 | A | 11/1990 | Bradshaw et al. |
| 4,978,404 | A | 12/1990 | Westerman, Jr. |
| 5,023,987 | A | 6/1991 | Wuepper et al. |
| 5,034,254 | A | 7/1991 | Cologna et al. |
| 5,190,611 | A | 3/1993 | Cologna et al. |
| 5,207,541 | A | 5/1993 | Westerman et al. |
| 5,214,307 | A | 5/1993 | Davis |
| 5,232,962 | A | 8/1993 | Dershem et al. |
| 5,344,515 | A | 9/1994 | Chenock, Jr. |
| 5,492,466 | A | 2/1996 | Frailey |
| 5,601,676 | A | 2/1997 | Zimmerman et al. |
| 5,618,606 | A | 4/1997 | Sherrick et al. |
| 5,620,768 | A | 4/1997 | Hoffmann, Sr. |
| 5,626,934 | A | 5/1997 | Brewer |
| 5,709,469 | A | 1/1998 | White et al. |
| 5,732,743 | A | 3/1998 | Livesay |
| 5,868,886 | A | 2/1999 | Alston et al. |
| 5,882,756 | A | 3/1999 | Alston et al. |
| 5,993,934 | A | 11/1999 | Reese et al. |
| 6,149,749 | A | 11/2000 | McBroom |
| 6,206,067 | B1 | 3/2001 | Kociemba et al. |
| 6,265,333 | B1 | 7/2001 | Dzenis et al. |
| 6,468,372 | B2 | 10/2002 | Kociemba et al. |
| 6,472,758 | B1 | 10/2002 | Glenn et al. |
| 6,656,299 | B1 | 12/2003 | Grosskrueger et al. |
| 6,680,099 | B1 | 1/2004 | Brewer |
| 6,758,924 | B1 | 7/2004 | Guijt |
| 6,761,783 | B2 | 7/2004 | Keller et al. |
| 7,325,771 | B2 | 2/2008 | Stulc et al. |
| 7,398,698 | B2 | 7/2008 | Griess et al. |
| 7,404,474 | B2 | 7/2008 | Yamaki et al. |
| 7,628,879 | B2 | 12/2009 | Ackerman |
| 7,935,205 | B2 | 5/2011 | Bogue et al. |
| 8,263,212 | B2 | 9/2012 | Care |
| 8,409,384 | B2 | 4/2013 | Dan-Jumbo et al. |
| 8,449,703 | B2 | 5/2013 | Dan-Jumbo et al. |
| 8,617,694 | B1 | 12/2013 | Dan-Jumbo et al. |
| 2001/0008161 | A1 | 7/2001 | Kociemba et al. |
| 2003/0075259 | A1 | 4/2003 | Graham |
| 2003/0188821 | A1 | 10/2003 | Keller et al. |
| 2005/0022923 | A1 | 2/2005 | Korchnak et al. |
| 2005/0053787 | A1 | 3/2005 | Yamasaki et al. |
| 2006/0011435 | A1 | 1/2006 | Yamaki et al. |
| 2006/0029807 | A1 | 2/2006 | Peck |
| 2006/0060705 | A1 | 3/2006 | Stulc et al. |
| 2006/0198980 | A1 | 9/2006 | Westerdahl |
| 2006/0243860 | A1 | 11/2006 | Kismarton |
| 2007/0095457 | A1 | 5/2007 | Keller et al. |
| 2007/0100582 | A1 | 5/2007 | Griess et al. |
| 2007/0289692 | A1 | 12/2007 | Bogue et al. |
| 2009/0053406 | A1 | 2/2009 | Ackerman |
| 2010/0047541 | A1 | 2/2010 | Care |
| 2010/0227105 | A1 | 9/2010 | Dan-Jumbo et al. |
| 2010/0227106 | A1 | 9/2010 | Dan-Jumbo et al. |
| 2010/0227117 | A1 | 9/2010 | Dan-Jumbo et al. |
| 2010/0233424 | A1 | 9/2010 | Dan-Jumbo et al. |
| 2013/0260077 | A1 | 10/2013 | Dan-Jumbo et al. |
| 2013/0337214 | A1 | 12/2013 | Dan-Jumbo et al. |

FOREIGN PATENT DOCUMENTS

| | | | |
|---|---|---|---|
| WO | WO2010104676 | A1 | 9/2010 |
| WO | WO2010104741 | A1 | 9/2010 |
| WO | WO2010104745 | A1 | 9/2010 |
| WO | WO2010104746 | A1 | 9/2010 |

OTHER PUBLICATIONS

Final Office Action, dated Jun. 7, 2012, regarding U.S. Appl. No. 12/400,519, 14 pages.

Notice of Allowance, dated Oct. 18, 2012, regarding U.S. Appl. No. 12/400,519, 20 pages.

International Search Report, dated Jun. 25, 2010, regarding Application No. PCT/US2010/025181 (WO2010104676), 3 pages.

International Search Report, dated May 21, 2010, regarding Application No. PCT/US2010/026229 (WO2010104741), 3 pages.

International Search Report, dated Jun. 29, 2010, regarding Application No. PCT/US2010/026252 (WO2010104745), 3 pages.

International Search Report, dated Jun. 29, 2010, regarding Application No. PCT/US2010/026256 (WO2010104746), 7 pages.

Baker, "Repair Techniques for Composite Structures," In: Composite Materials in Aircraft Structures, Middleton (Ed.), Longman, Jan. 1, 1990, pp. 207-227.

Berthelot, "Effect of the Stacking Sequence on Mat and Cloth Reinforcement Materials," In: Composite Materials: Mechanical Behavior and Structural Analysis (Cole, Trans.), Springer Publishing, New York, 1998, pp. 312-345.

Chang et al., "Properties and failure mechanisms of z-pinned laminates in monotonic and cyclic tension," Composites Part A: Applied Science and Manufacturing, vol. 37, No. 10, Oct. 2006, pp. 1501-1513.

Chang, "A Study on Fracture Toughness of Advanced Structural Composites," Naval Air Development Center Report No. EW-4-73, Jul. 1973, 113 pages.

Dan-Jumbo et al., "Bonded Patch Having Multiple Zones of Fracture Toughness," U.S. Appl. No. 12/706,799, filed Feb. 17, 2010, 47 pages.

Dan-Jumbo et al., "Discretely Tailored Multi-Zone Bondline for Fail-Safe Structural Repair," U.S. Appl. No. 12/903,489, filed Oct. 13, 2010, 43 pages.

Gacoin et al., "Comparison between experimental and numerical study of the adhesively bonded scarf joint and double scarf joint: Influence of internal singularity created by geometry of the double scarf joint on the damage evolution," International Journal of Adhesion and Adhesives, vol. 29, No. 5, Jul. 2009, pp. 572-579.

Harman et al., "Improved design methods for scarf repairs to highly strained composite aircraft structure," Composite Structures, vol. 75, No. 1-4, Sep. 2006, pp. 132-144.

Kan et al., "Advanced Certification Methodology for Composite Structures," U.S. Department of Transportation Federal Aviation Administration Final Report No. DOT/FAA/AR-96/111, Apr. 1997, 167 pages.

Kelly, "Composite Structure Repair," AGARD Report No. 716, Feb. 1984, 26 pages.

Komoroski et al., "Stacking Sequence Effects and Delamination Growth in Graphite/Epoxy Laminates Under Compression-Dominated Fatigue Loading," In: Composite Materials: Fatigue and Fracture—Fifth Volume, Martin (Ed.), ASTM International, Oct. 1995, pp. 249-267.

Mouritz, "Review of z-pinned composite laminates," Composites Part A: Applied Science and Manufacturing, vol. 38, No. 12, Dec. 2007, pp. 2383-2397.

Prieto, "Modeling and analysis of crack turning on aeronautical structures," Doctoral Thesis, Universitat Politecnica de Catalunya, Apr. 2007, pp. 83-106.

Seng, "Laminate Design," In: Handbook of Composites, Second Edition, Peters (Ed.), Chapman & Hall, London, 1998, pp. 686-695.

Tomblin et al., "Assessment of Industry Practices for Aircraft Bonded Joints and Structures," U.S. Department of Transportation Federal Aviation Administration Final Report No. DOT/FAA/AR-05/13, Jul. 2005, 245 pages.

Tomblin et al., "Bonded Repair of Aircraft Composite Sandwich Structures," U.S. Department of Transportation Federal Aviation Administration Final Report No. DOT/FAA/AR-03/74, Feb. 2004, 121 pages.

Wang et al., "Optimum Shapes for Minimising Bond Stress in Scarf Repairs," Proceedings of the 5th Australasian Congress on Applied Mechanics (ACAM2007), Dec. 2007, 6 pages.

"Damage-tolerance and fatigue evaluation of structure," U.S. Department of Transportation Federal Aviation Regulation 14 CFR 25.571, Apr. 1998, 3 pages. Accessed May 29, 2012 from http://www.flightsimaviation.com/data/FARS/part_25-571.html.

(56) References Cited

OTHER PUBLICATIONS

Office Action, dated Dec. 22, 2011, regarding U.S. Appl. No. 12/400,475, 15 pages.
Final Office Action, dated Jun. 7, 2012, regarding U.S. Appl. No. 12/400,475, 14 pages.
Notice of Allowance, dated Oct. 29, 2012, regarding U.S. Appl. No. 12/400,475, 20 pages.
Office Action dated Jan. 2, 2013, regarding U.S. Appl. No. 12/706,799, 33 pages.
Office Action, dated Jul. 14, 2011, regarding U.S. Appl. No. 12/401,541, 13 pages.
Final Office Action, dated Dec. 16, 2011, regarding U.S. Appl. No. 12/401,541, 10 pages.
Office Action, dated Jul. 24, 2012, regarding U.S. Appl. No. 12/401,541, 18 pages.
Final Office Action, dated Dec. 14, 2012, regarding U.S. Appl. No. 12/401,541, 13 pages.
Office Action, dated Feb. 1, 2012, regarding U.S. Appl. No. 12/400,560, 13 pages.
Final Office Action, dated Jul. 5, 2012, regarding U.S. Appl. No. 12/400,561, 15 pages.
Notice of Allowance, dated Feb. 22, 2013, regarding U.S. Appl. No. 12/400,561, 19 pages.
Office Action, dated Nov. 9, 2012, regarding U.S. Appl. No. 12/903,489, 29 pages.
Office Action, dated May 23, 2013, regarding U.S. Appl. No. 12/903,489, 15 pages.
Office Action, dated Jan. 8, 2014, regarding U.S. Appl. No. 13/902,855, 35 pages.
Notice of Allowance, dated Apr. 9, 2014, regarding U.S. Appl. No. 13/902,855, 12 pages.

| Ply # | Third Region 40 | Second Region 38 | First Region 36 |
|---|---|---|---|
| 1 | 0 | 0 | 0 |
| 2 | 90 | 90 | 90/+45 |
| 3 | none | none | -45 |
| 4 | 90 | 0 | 0 |
| 5 | 90 | 0 | 0 |
| 6 | none | none | -45 |
| 7 | 90 | 90 | 90/+45 |
| 8 | 0 | 0 | 0 |

PREDICTABLE BONDED REWORK OF COMPOSITE STRUCTURES USING TAILORED PATCHES

CROSS REFERENCE TO RELATED APPLICATIONS

This application is a divisional application of U.S. patent application Ser. No. 12/400,519, filed Mar. 9, 2009, status pending. This application is related to U.S. patent application Ser. No. 12/400,475, filed Mar. 9, 2009, now U.S. Pat. No. 8,409,384, issued on Apr. 2, 2013, and U.S. patent application Ser. No. 12/400,561, filed Mar. 9, 2009, status pending, both of which are incorporated by reference herein in their entireties.

TECHNICAL FIELD

This disclosure generally relates to composite structures, and deals more particularly with a method and composite patch for reworking areas of composite structures containing inconsistencies.

BACKGROUND

Composite structures sometimes have localized areas containing one or more inconsistencies that may require rework in order to bring the structure within design tolerances.

In the past, one rework process was performed using a patch that was placed over the inconsistent area and secured to the parent structure using mechanical fasteners. This rework technique was desirable because the condition of the patch could be monitored over time by visually inspecting the fasteners. However, the use of fasteners may increase aircraft weight and/or drag on the aircraft, and may be esthetically undesirable in some applications.

In some applications, rework patches have been secured to a parent structure using a bonded joint, however this technique may also require the use of mechanical fasteners that provide secondary load paths forming an arrestment mechanism to limit the growth of an inconsistency. Furthermore, changes in a bonded joint securing a rework patch on a parent structure may not be easily monitored over time because the attaching mechanism of the joint or joint interface may not be visible.

Accordingly, there is a need for a rework patch and method of reworking inconsistent areas of composite structures, while allowing the condition of the reworked area to be monitored over time using visual or other types of non-destructive inspection techniques.

SUMMARY

The disclosed embodiments provide a rework patch and method of reworking composite structures using a bonded rework patch without the need for mechanical fasteners. The rework patch includes features that allow visual inspection of the condition of the reworked area over time and permit reliable prediction of future bond joint changes. Because the condition of the reworked area may be visually inspected and predictions made about future bond condition, the bonded rework patch and visual inspection technique may allow certification of the rework by aircraft certifying authorities.

According to one disclosed embodiment, a patch for reworking an inconsistent area of a composite structure comprises a composite laminate patch and a layer of adhesive for bonding the laminate patch to the composite structure. The laminate patch is adapted to cover the inconsistent area and has at least first and second regions for releasing strain energy around the inconsistent area respectively at different rates. The laminate patch may include a plurality of fiber reinforced composite laminate plies, wherein the plies in the first region possess characteristics that are different from those of the plies in the second region. The layer of adhesive may include at least first and second sections that respectively underlie and are substantially coextensive with the first and second regions of the laminate patch.

According to another embodiment, a composite rework patch is adapted to be adhesively bonded to a composite structure over an area containing inconsistencies in the structure. The rework patch comprises a plurality of laminated composite plies. The composite plies have multiple regions of differing interlaminar fracture toughness for controlling changes in the condition of the patch. The multiple regions may include first, second and third regions that are substantially concentric around the area of inconsistencies.

According to a further embodiment, a method is provided for reworking an area of a composite structure. The method includes fabricating a composite laminate patch and bonding the laminate patch to the composite structure in the rework area. Fabricating the laminate patch includes forming multiple regions respectively having differing interlaminar fracture toughnesses. Fabricating the patch may be performed by forming a layup of fiber reinforced polymer plies, including forming the multiple regions within the layup, and curing the layup. Forming the multiple regions may include providing the plies in each of the regions with respectively differing characteristics related to interlaminar fracture toughnesses.

The disclosed embodiments satisfy the need for a bonded composite rework patch and method of rework that allow rework of an inconsistent area in a composite structure, in which the condition of the rework can be visually monitored, and any change of the bonded joint may be predicted based on the visual inspection.

BRIEF DESCRIPTION OF THE ILLUSTRATIONS

DETAILED DESCRIPTION

Figure 1:
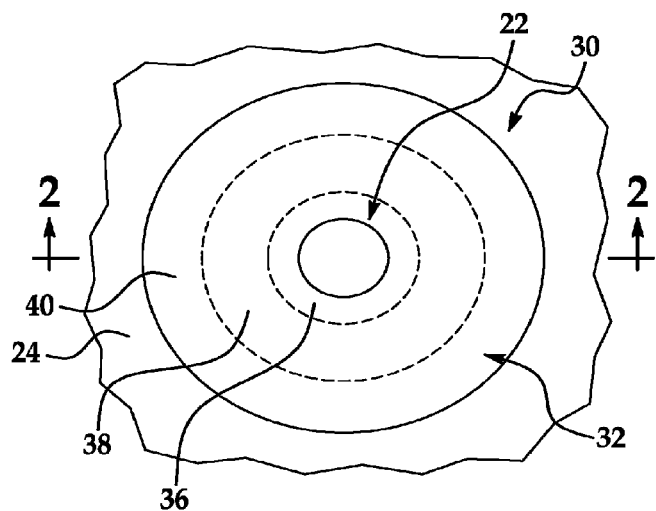
FIG. 1 is an illustration of a bonded rework patch on a composite structure.
Figure 2:
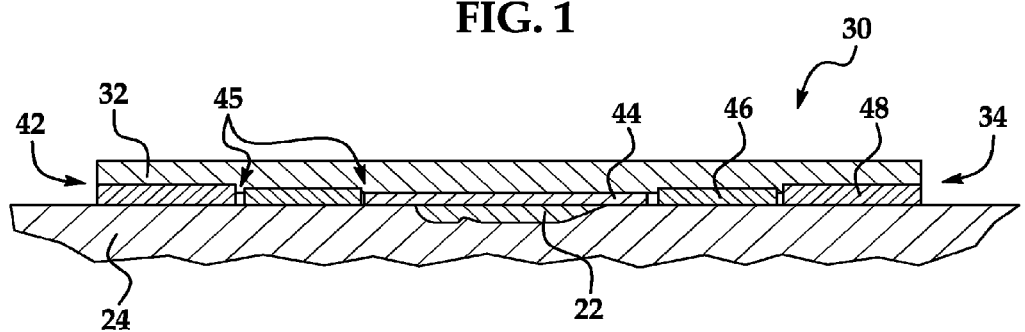
FIG. 2 is an illustration of a sectional view taken along the line 2-2 in FIG. 2.

Referring now to FIGS. 1 and 2, according to the disclosed embodiments, a composite rework patch 30 is used to rework an inconsistent area 22 in a composite structure 24. As used herein, "inconsistent area", "inconsistency" and "inconsistencies" each refer to a localized area in the composite structure 24 that may be outside of designed tolerances. The inconsistent area 22 may comprise, for example and without limitation, a void, a dent, or a porosity that may occur at the time that the composite structure 24 is manufactured, or later during the service life of the composite structure 24.

The composite rework patch 30 comprises a laminate layer 32 which overlies the inconsistent area 22 and is bonded to the composite structure 24 by an adhesive layer 34 comprising a structural adhesive forming a bond joint 42. The size of the composite rework patch 30 may vary with the application and the dimensions of the inconsistent area 22. The adhesive layer 34 divides the bond joint 42 and inconsistent area 22 into first, second and third control regions 36, 38, 40 respectively, that may provide a graceful reduction of transition loads transmitted between the composite structure 24 and the composite rework patch 30. The first control region 36 is centrally located over the inconsistent area 22, and the second and third control regions 38, 40 may respectively comprise a pair of substantially concentric rings surrounding the centrally located first control region 36. While the control regions 36, 38, 40 are shown as being generally circular in the disclosed embodiment, a variety of other shapes are possible. Also, in other embodiments, the composite rework patch 30 may have only two control regions, or may have more than three control regions.

The first control region 36 may exhibit favorable in-plane adhesive stresses. The second control region 38 may be referred to as a durability region and any disbond within this region between the laminate layer 32 and the composite structure 24 may need to be evaluated and quantified in order to determine whether rework should be performed. The third control region 40, which may be dominated by in-plane shear and peeling moments, may affect the behavior of the entire structural bond between the laminate layer 32 and composite structure 24.

Figure 3:
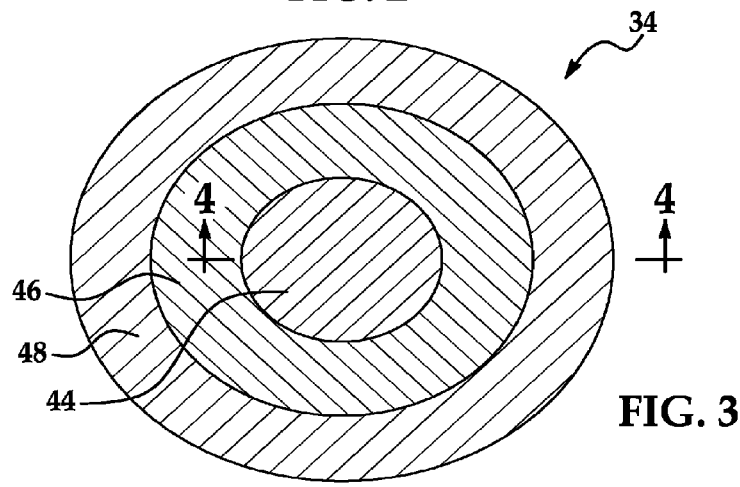
FIG. 3 is an illustration of a plan view of the adhesive layer shown in FIG. 2.
Figure 3A:
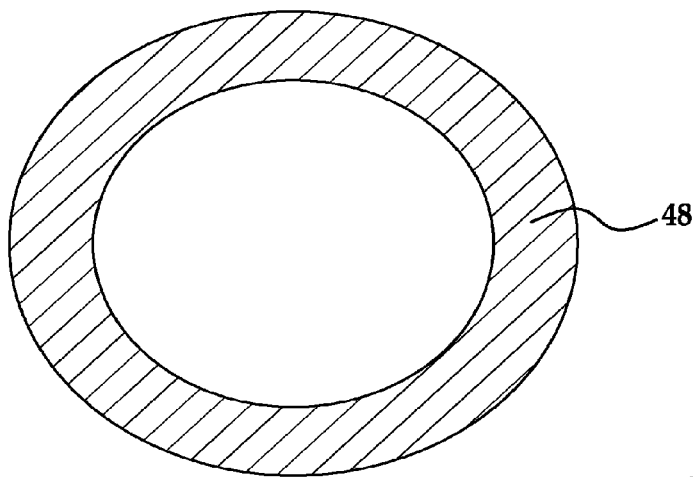
FIGS. 3a-3c are illustrations of plan views respectively of sections of the adhesive layer shown in FIG. 3.
Figure 3B:
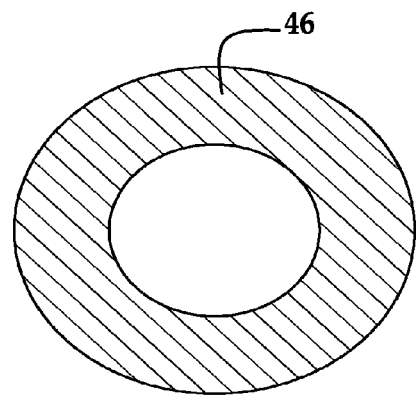
Figure 3C:
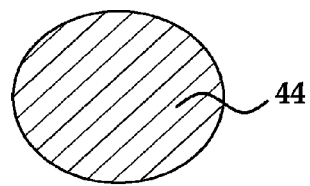
Figure 4:
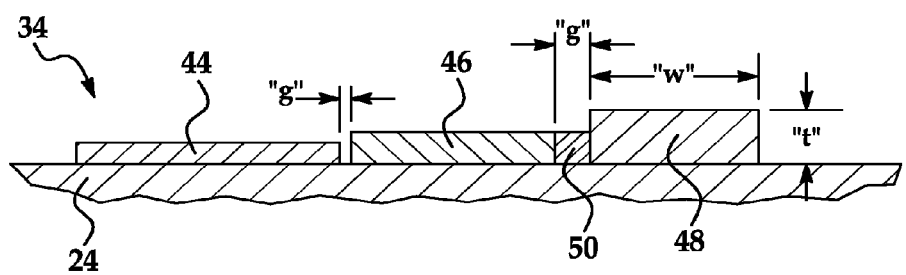
FIG. 4 is an illustration of a sectional view taken along the line 4-4 in FIG. 3.

Referring now particularly to FIGS. 2-4, the adhesive layer 34 may comprise a central first adhesive section 44 surrounded by concentric ring shaped second and third adhesive sections 46 and 48. The size and shape of the first, second, and third adhesive sections 44, 46, 48 generally correspond to the first, second and third control regions 36, 38, 40 respectively of the composite rework patch 30. Each of the first, second, and third adhesive sections 44, 46, 48 may comprise one or more plies of a commercially available structural adhesive which is generally available in film or sheet form that may be cut to the desired shape. The first, second, and third adhesive sections 44, 46, 48 may also be formed from a commercially available structural adhesive paste. As previously noted, multiple plies (not shown) of the adhesive sheet material may be built up to form a desired thickness "t" for each of the first, second, and third adhesive sections 44, 46, 48. The strength of the bond may be tailored using the thickness "t" between laminate layer 32 and composite structure 24. In some applications only a single ply of adhesive sheet material may be required, while in other applications, more than one ply may be necessary, depending on the application and the thickness of the adhesive sheet.

In one embodiment, circumferential gaps "g" may be formed between first, second, and third adhesive sections 44, 46, 48 to aid in arresting the growth of potential debonding between the laminate layer 32 and the composite structure 24. A filler 50 may be placed in one or both of the gaps "g" to aid in the arrestment.

The properties of each of the first, second, and third adhesive sections 44, 46, 48 may be tailored in a manner that affects the rate at which first, second and third control regions 36, 38, 40 of the bond joint 42 respectively release strain energy. Tailoring of each of the first, second, and third adhesive sections 44, 46, 48 may be achieved by altering the dimensions of the first, second, and third adhesive sections 44, 46, 48, such as thickness "t" or width "w", or by altering the form of the film, paste, scrim, etc., as well as by altering the structural properties of the adhesive layer, such as fracture toughness, peel or shear properties, or by providing the gap "g" between the first, second, and third adhesive sections 44, 46, 48. Fracture toughness may be described as the general resistance of a material to delaminate. Additionally, a spacer or filler 50 may be interposed between first, second, and third adhesive sections 44, 46, 48 to aid in arresting disbond growth.

The use of the tailored first, second, and third adhesive sections 44, 46, 48 may result in a bonded composite rework patch 30 that is divided into multiple control regions 36, 38, 40 that release strain energy at different rates. The first, second, and third control regions 36, 38, 40 provide for a graceful reduction of transition loads between the laminate layer 32 and the composite structure 24, which may not only allow prediction of a course of disbond extension, but can allow assessment of the condition of the composite rework patch 30 through simple visual inspection, or other non-destructive inspection techniques. Although three control regions are shown and discussed, more or less than three control regions may be possible.

The first control region 36 of the composite rework patch 30 which overlies the inconsistent area 22 exhibits favorable in-plane stresses that may suppress the stress concentration around the boundary of a disbond of the bond joint 42. The global adhesive stresses within the first control region 36 may reduce the strain energy release rate necessary for extension of a disbond under maximum load limits applied to the composite structure 24.

The characteristics of the composite rework patch 30 within the second control region 38 may result in the release of strain energy at a rate greater than that of the first control region 36. Any disbond that may occur in the bond joint 42 within the second control region 38 may be anticipated by a fatigue durability disbond curve (not shown) which defines the work input required to initiate disbond growth. The characteristics of the third control region 40 are selected such that the strain energy release rate within the third control region 40 is greater than that of the second control region 38 to discourage disbond initiation and growth, as well as in-plane shear and peeling moments.

Figure 5:
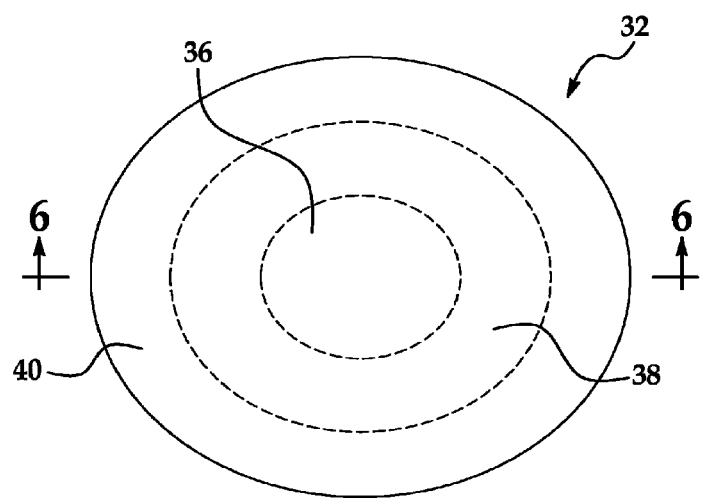
FIG. 5 is an illustration of a plan view of a composite laminate patch forming part of the rework patch shown in FIG. 1.
Figure 6:
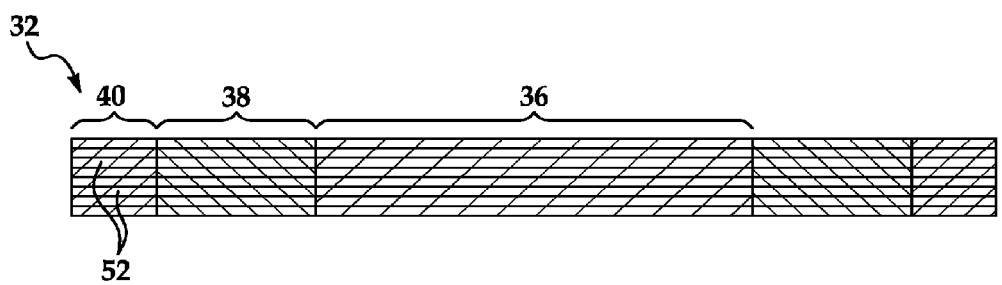
FIG. 6 is an illustration of a sectional view taken along the line 6-6 in FIG. 5.

Attention is now directed to FIGS. 5 and 6 which illustrate a laminate layer 32 comprising multiple plies 52 of fiber reinforced polymer in which the plies 52 may be tailored in order to aid in achieving first, second and third control regions 36, 38, 40 respectively, having the desired strain energy release rates. Strain energy release rate within the laminate layer 32 may be tailored within the control regions 36, 38, 40 by selecting and/or arranging the plies such that the plies in each of the first, second and third control regions 36, 38, 40 have different characteristics. In other words, each of the first, second and third control regions 36, 38, 40 may have ply characteristics that are unique to that region. Thus, for example, the plies in the second control region 38 may have characteristics that are different from those in first or third control regions 36 or 40, and the plies in first control region 36 may have characteristics that are different than those in second and third control regions 38 and 40. As used herein, "characteristics" and "ply characteristics" refer to, without limitation: the type, size or quantity of fiber reinforcement in a ply; ply thickness; gaps between the plies; materials, elements or structures placed between the plies; the number of plies; the type or density of matrix used in the ply; the layup orientation (angle) of each ply and/or the sequence of ply orientations in a stack of the plies.

The strain energy release rate within one of more of the first, second, and third control regions 36, 38, 40 may be tailored by forming a scarf or tapered joint (not shown) between the laminate layer 32 and the composite structure 24. The strain energy release rate may also be tailored by providing gaps (not shown) in certain areas between plies 52 in a manner that may alter the mechanical properties of the laminate layer 32 in each of the first, second, and third control regions 36, 38, 40. Also, it may be possible to employ differing orientation sequences of the plies 52 in order to aid in achieving the defined first, second, and third control regions 36, 38, 40. Orientation refers to the layup angle or direction of reinforcing fibers in a ply, for example and without limitation, 0°, 30°, 60°, 90° and/or 0°, +45°, −45°, 90°.

In the example illustrated in FIGS. 5 and 6, the materials used in the plies 52 and/or the orientation sequences within the first control region 36 result in the highest rate of strain relief, while the selection of these materials and/or ply orientation sequences in second and third control regions 38 and 40 respectively result in intermediate and lowest rates of release of strain energy, respectively. In other embodiments, however, depending on the application, the third control region 40 may possess highest rate of strain energy relief, while the first control region 36 posses the lowest rate of strain energy relief.

Figures 7, 8:
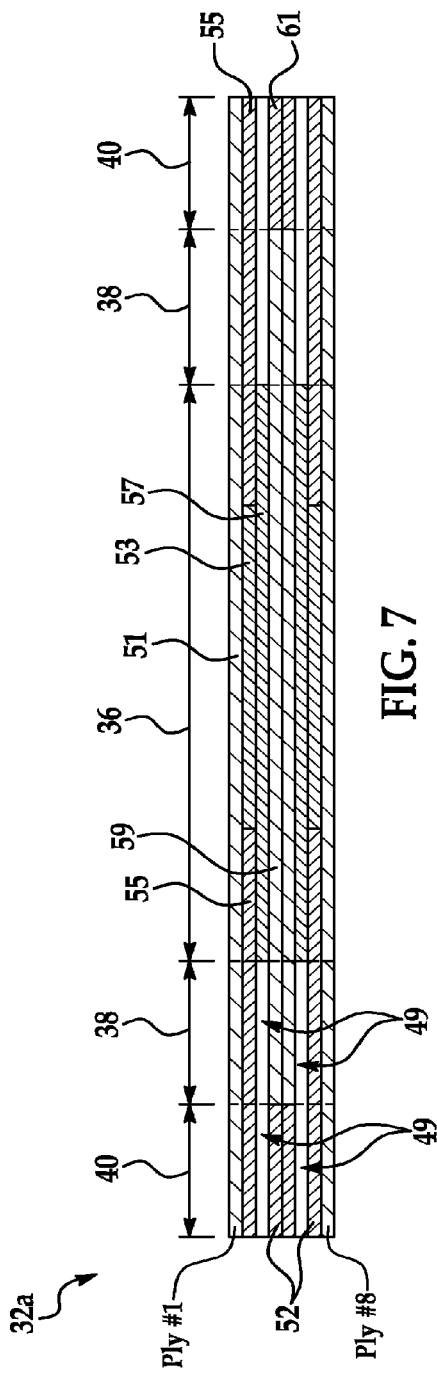
FIG. 7 is an illustration of a sectional view similar to FIG. 6, but showing details of a tailored laminate patch divided into regions having differing interlaminar toughness.
FIG. 8 is an illustration of a table showing a ply schedule for the differing regions of the tailored laminate patch shown in FIG. 7.
Figure 9:
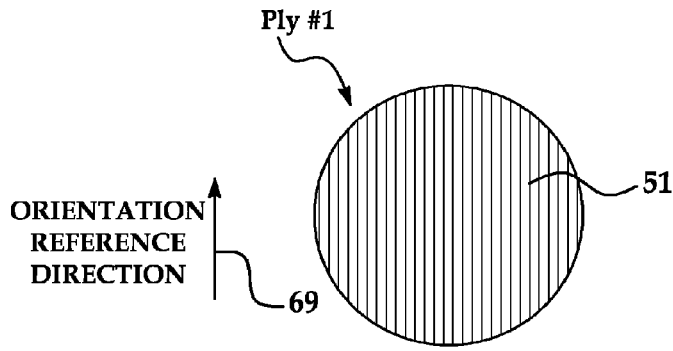
FIGS. 9-12 are illustrations of plan views respectively illustrating plies 1-4 in the laminate patch shown in FIG. 7.
Figure 10:
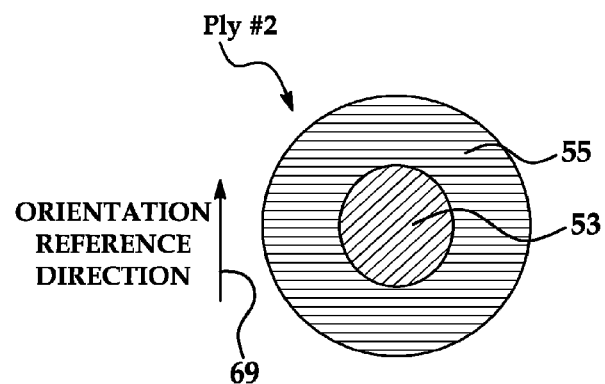
Figure 11:
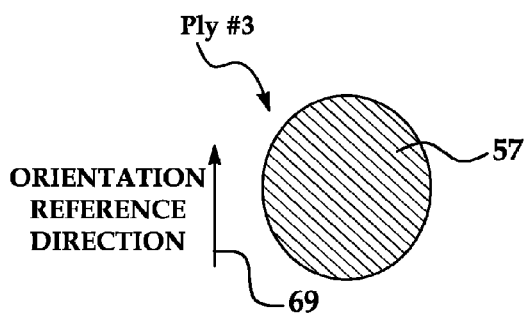
Figure 12:
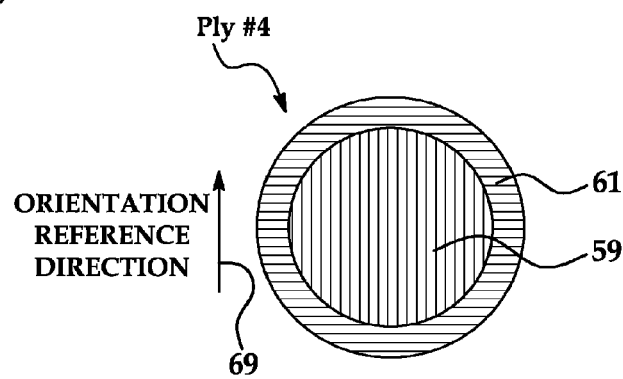

Attention is now directed to FIG. 7 which illustrates a typical tailored laminate patch 32a comprising eight plies 52 of fiber reinforced polymer, before being compacted and cured into a consolidated laminate. When viewed in plan, the shape of the tailored laminate patch 32a, including first, second, and third control regions 36, 38, 40, may be substantially the same as that of the composite rework patch 32 illustrated in FIG. 5. The plies 52 forming the tailored laminate patch 32a may be referred to as plies #1-#8. FIG. 8 is a table illustrating the ply orientations for the laminate patch 32a within first, second, and third control regions 36, 38, 40 for each of the plies #1-#8, while FIGS. 9-12 show the constituent sections of plies 1-4.

As mentioned above in connection with FIGS. 5 and 6, the characteristics of the plies 52 may be different in each of the first, second, and third control regions 36, 38, 40. The rate of release of strain energy in regions 36, 38 and 40 is related to the modulus or stiffness that defines the interlaminar toughness of the tailored laminate patch 32a in the respective first, second, and third control regions 36, 38, 40. In the disclosed embodiment, the first control region 36 has the highest interlaminar fracture toughness, while the third control region 40 possesses the lowest interlaminar fracture toughness. In one practical application for example, and without limitation, the interlaminar fracture toughness of the third control region 40 has an interlaminar fracture toughness that may be between approximately 0.5 and 1.0 in-#/in2, and the second control region 38 has an interlaminar fracture toughness that may be between approximately 1.5 and 2.0 in-#/in2. The first control region 36 in this example has an interlaminar fracture toughness that may be equal to or greater than approximately 2.5 in-#/in2. In other embodiments, however, the third control region 40 may have the highest interlaminar fracture toughness and the first control region 36 may have the lowest interlaminar fracture toughness, with the interlaminar fracture toughness of the second control region 38 being between that of the first and third control regions 36, 40, respectively.

The particular values of the interlaminar fracture toughness for the first, second, and third control regions 36, 38, 40 will depend upon the application and the particular mechanical properties of the plies 52 that are present within the first, second, and third control regions 36, 38, 40. Moreover, the values for the interlaminar fracture toughness within the first, second, and third control regions 36, 38, 40 may be tailored to the properties of the adhesive layer 34 (see FIG. 3), including the first, second, and third adhesive sections 44, 46, 48 of the adhesive layer 34 so that the first, second, and third adhesive sections 44, 46, 48 of the adhesive layer 34 and the mechanical properties of the tailored laminate patch 32a within first, second, and third control regions 36, 38, 40 are suitably matched to provide maximum performance. Although not shown in FIG. 7, the first, second, and third adhesive sections 44, 46, 48 of the adhesive layer 34 respectively underlie, and may be substantially coextensive with the first, second, and third control regions 36, 38, 40 of the laminate patch 32a.

As previously discussed, the interlaminar fracture toughness within the first, second, and third control regions 36, 38, 40 may be controlled by using differing prepreg materials in the plies 52, and/or by overlapping the plies 52 between adjacent ones of the first, second, and third control regions 36, 38, 40, and/or by using different ply orientation sequences within each of the first, second, and third control regions 36, 38, 40. For example, FIG. 8 illustrates differing ply orientation sequences for plies #1-#8 within each of the first, second, and third control regions 36, 38, 40. It can be seen for example, that in comparing the orientation sequence of the plies 52 for the second and third control regions, 38, 40 respectively, ply #4 and ply #5 are oriented at 90° in the third region 40, but have a 0° orientation in the second control region 38. As previously mentioned, ply orientation refers to the direction of orientation of unidirectional reinforcing fibers held in a polymer matrix, usually a prepreg, which forms each of the plies 52. The sequence of orientations of the plies #1-#8 for the first control region 36 is different from the sequence of orientations for either the second or third control regions, 38, 40.

Referring now particularly to FIGS. 7 and 9-12, it can be seen that ply #1 comprises a single, circularly shaped section 51 (FIG. 9) having a 0° degree fiber orientation relative to an orientation reference direction 69, which extends across all of the first, second, and third control regions 36, 38, 40. Ply #2 includes a circular center section 53 (FIG. 10) having a +45° fiber orientation, and an outer, ring shaped section 55 having a 90° orientation. As a result of the configuration of ply #2, region 36 has combined fiber orientations of 90° and +45° degrees, while regions 38 and 40 both have 90° fiber orientations. Ply #3 comprises a single section 57 (FIG. 11) within first control region 36 having a −45° fiber orientation, while in second and third control regions 38 and 40, gaps 49 (FIG. 7) are present. Finally, ply #4 (FIG. 12) comprises a section 59 having a 0° fiber orientation that extends throughout first and second control regions 36 and 38. Section 59 is surrounded by a section 61 having a 90° fiber orientation which is confined to the third control region 40. Ply #s 5-8 shown in FIG. 7 are essentially a mirror image of ply #s 1-4 described above.

From the forgoing, it can be appreciated that each of the first, second, and third control regions 36, 38, 40 possesses a unique interlaminar fracture toughness in the tailored laminate patch 32a, and/or the bond joint 42 (FIG. 2). The interlaminar fracture toughness within the first, second, and third control regions 36, 38, 40 of the tailored laminate patch 32a may be tailored to and compliment the global adhesive stresses in the bond joint 42 so as to contain and resist growth of inconsistencies either in the tailored laminate patch 32a or the bond joint 42.

Figure 13:
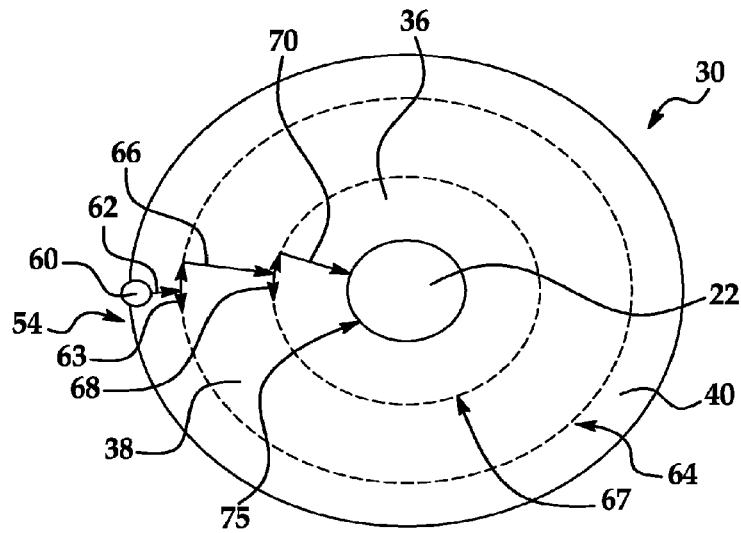
FIG. 13 is an illustration of a plan view of the rework patch shown in FIG. 1, and illustrating a typical propagation path of a debonding.

FIG. 13 illustrates the manner in which a disbond beginning at outer edge 60 of the third control region 40 and growing inwardly, may be arrested. The disbond beginning at outer edge 60 may be illustrated in this scenario as growing directly inward, as shown at 62 until the boundary 64 is reached between second and third control regions 38 and 40. As a result of the difference in materials in the first, second, and third control regions 36, 38, 40, and/or the presence of a gap "g" or filler 50 (FIG. 4), and/or the difference in the adhesive properties of the first, second, and third adhesive sections 44, 46, 48 of the adhesive layer 34 (FIG. 2), the disbond is arrested and may move circumferentially around 63 the boundary 64 of the third control region 40. Another scenario may have a disbond progressing from the third control region 40 and into the second control region 38, and progressing inwardly toward the first control region 36, as indicated by the numeral 66. When the progression of the disbond reaches the boundary 67 between control regions 36 and 38, it is arrested and may move circumferentially around 68 the boundary 67.

Figure 14:
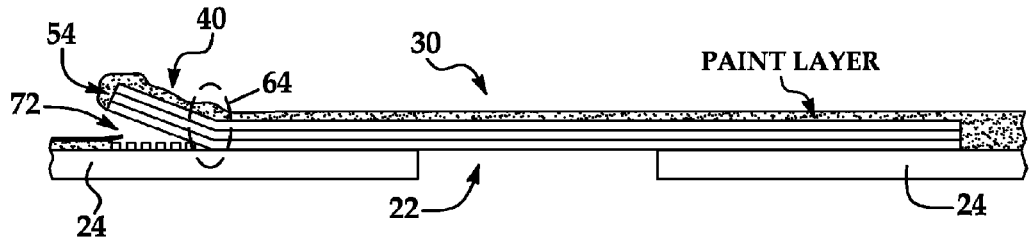
FIGS. 14-16 are illustrations of sectional views showing progression of the debonding through regions of the patch.

Referring concurrently to FIGS. 13 and 14, as the disbond 72 moves inwardly from the beginning point 60, the outer edge 54 of the composite rework patch may peel upwardly thereby cracking overlying paint (not shown) which provides a visual indication of disbond initiation and/or growth within the third control region 40. This visual indication of a disbond may terminate at the boundary 64 between second and third control regions 38 and 40.

Figure 15:
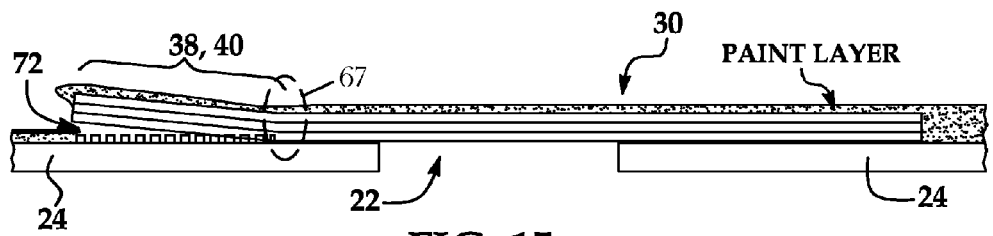
Figure 16:
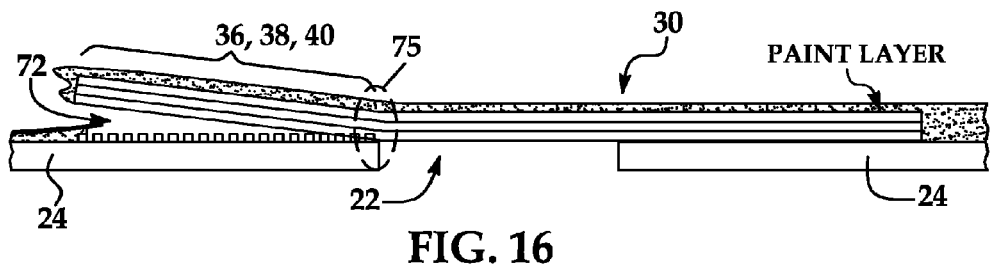

As shown in FIG. 15, if the disbond 72 continues into the second control region 38 toward the boundary 67, the composite rework patch 30 in the area of the second and third control regions 38 and 40 may peel upwardly, thereby further cracking overlying paint to provide a visual indication that the disbond has progressed into or through the second control region 38. FIG. 16 illustrates the disbond having progressed up to the boundary 75 of the inconsistent area 22. At this point, the areas of the composite rework patch 30 and all three of the first, second, and third control regions 36, 38, 40 may peel upwardly to further crack overlying paint, thereby providing a still more obvious visual indication that the disbond has advanced to a point where the composite rework patch 30 may need further attention. From the foregoing, it is apparent that the first, second, and third control regions 36, 38, 40 of the composite rework patch 30 provide a means of allowing nondestructive visual inspection of the condition of the composite rework patch 30, including the bond joint 42 between the composite rework patch 30 and the composite structure 24. As previously noted, other non-destructive inspection techniques may be used to assess the condition of the composite rework patch 30, instead of, or as a supplement to, visual inspection.

Figure 17:
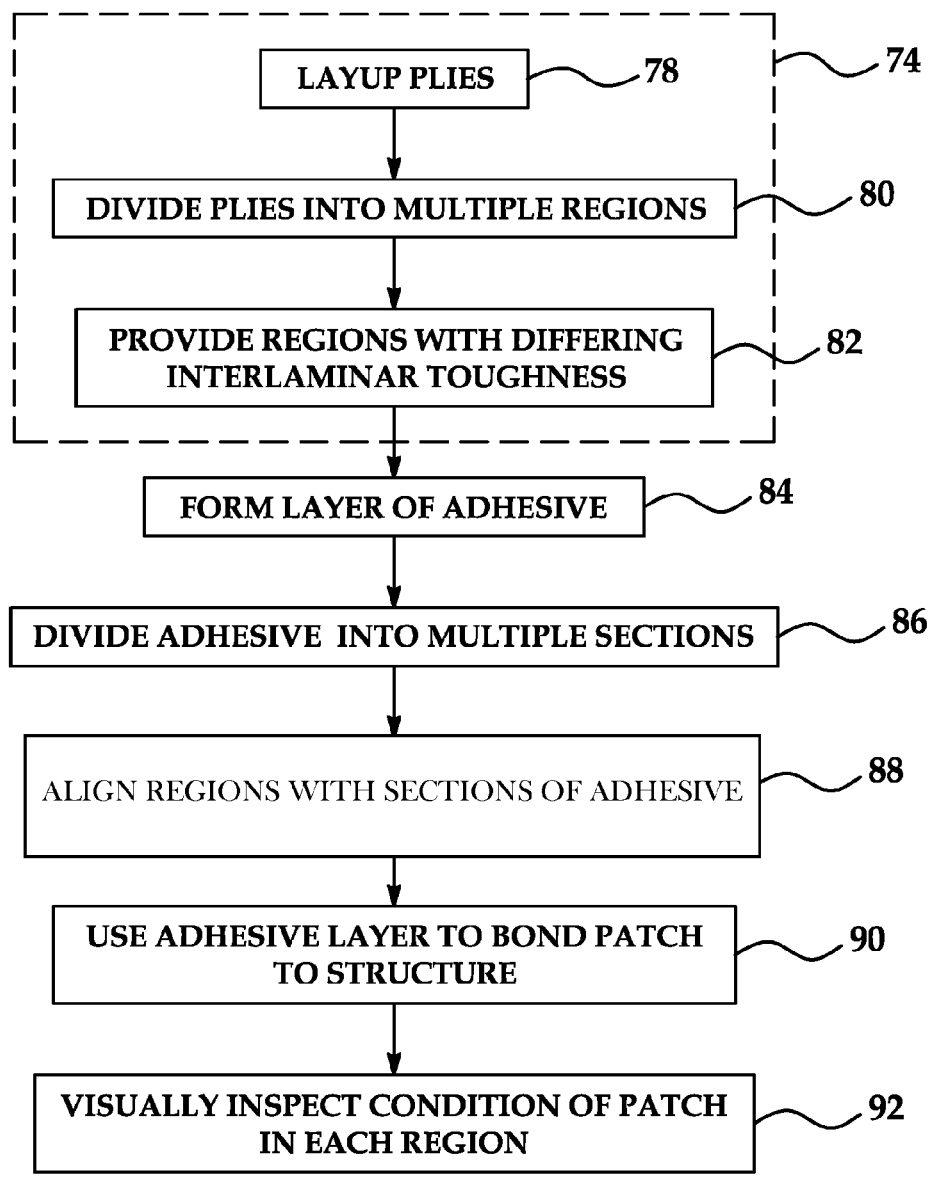
FIG. 17 is an illustration of a flow diagram for a method for reworking an inconsistent area of a composite structure.

Attention is now directed to FIG. 17 which illustrates a method for reworking areas of a composite structure containing inconsistencies using a patch, such as the tailored rework patch 32a discussed above. The laminate layer is formed by a series of steps 74 beginning with laying up plies 78 using a ply schedule and orientation sequence that may be similar to those shown in FIGS. 7 and 8. As shown at 80, the plies are divided into multiple regions as part of the ply layup 78. Also, the regions are provided with differing interlaminar fracture toughness as shown at 82, by using differing materials and/or ply orientations as previously discussed.

At 84, a layer of adhesive is formed, and at 86, the adhesive layer is divided into multiple sections. The regions are then aligned, as shown at step 88, with the sections of the adhesive layer. The adhesive layer is used to bond the patch to a structure, as shown at step 90. At step 92, the patch may be visually inspected over time to determine the condition of the patch in each of the regions.

Figure 18:
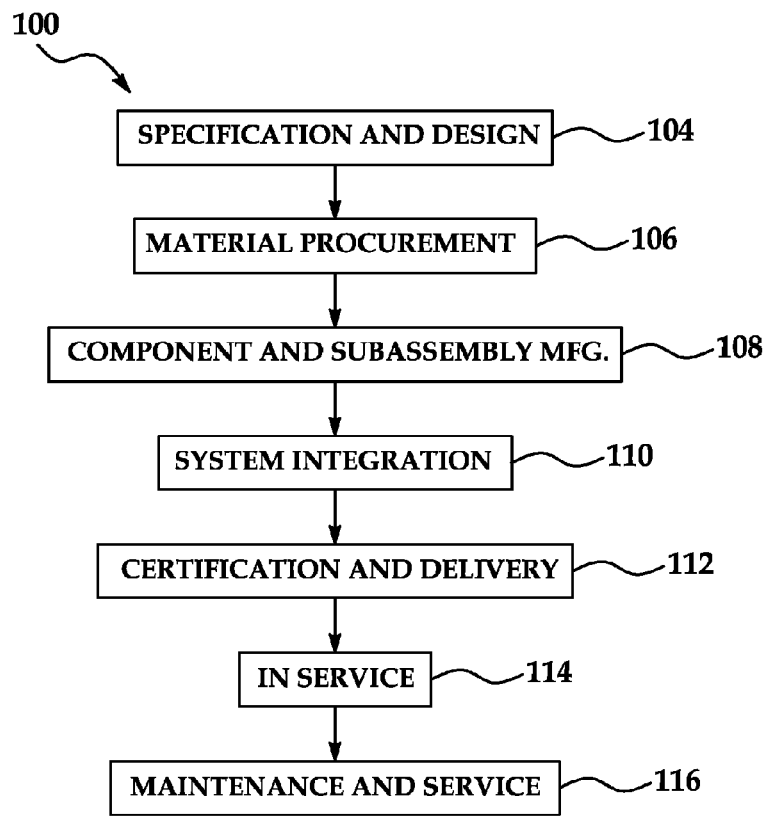
FIG. 18 is an illustration of a flow diagram of aircraft production and service methodology.
Figure 19:
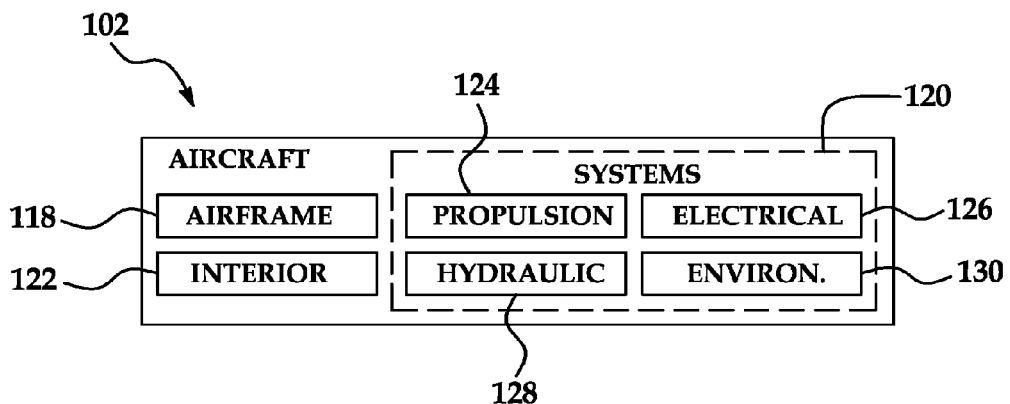
FIG. 19 is an illustration of a block diagram of an aircraft.

Embodiments of the disclosure may find use in a variety of potential applications, particularly in the transportation industry, including for example, aerospace, marine and automotive applications. Thus, referring now to FIGS. 18 and 19, embodiments of the disclosure may be used in the context of an aircraft manufacturing and service method 100 as shown in FIG. 18 and an aircraft 102 as shown in FIG. 19. During pre-production, exemplary method 100 may include specification and design 104 of the aircraft 102 and material procurement 106. Composite rework patches may be specified and designed as part of the specification and design 104 of the aircraft 102, and procured as part of the procurement process 106.

During production, component and subassembly manufacturing 108 and system integration 110 of the aircraft 102 takes place. Composite rework patches may be used during production to rework inconsistencies that occur during the manufacturing 108 and/or system integration 110. Thereafter, the aircraft 102 may go through certification and delivery 112 in order to be placed in service 114. Composite rework patches may be used to rework inconsistencies in order to achieve certification of the aircraft 102 and/or to satisfy delivery requirements. While in service by a customer, the aircraft 102 is scheduled for routine maintenance and service 116 (which may also include modification, reconfiguration, refurbishment, and so on). Composite rework patches may be used while the aircraft 102 is in service to rework areas of the aircraft 102 that may develop inconsistencies while in service, and the condition of the patches 30 may be checked as part of a periodic maintenance routine.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 102 produced by exemplary method 100 may include an airframe 118 with a plurality of systems 120 and an interior 122. The patches 30 may be used to rework inconsistencies in the airframe 118. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the marine and automotive industries.

Systems and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Although the embodiments of this disclosure have been described with respect to certain illustrative embodiments, it is to be understood that the specific embodiments are for purposes of illustration and not limitation, as other variations will occur to those of skill in the art.

The invention claimed is:

1. A patch for reworking an inconsistent area of a composite structure, the patch comprising:
    a laminate patch adjacent to a layer of adhesive adjacent to the composite structure, the laminate patch and the layer of adhesive configured to bond to each other and form a first control region, and a second control region configured to surround the first control region, the laminate patch comprising a first ply and a second ply, each ply comprising a first region, and a second region configured to surround the first region, the first region and the second region each tailored to release strain energy at respectively different rates; the layer of adhesive configured to bond the laminate patch to a surface, the layer of adhesive comprising: a first section comprising a width greater than a width of the inconsistent area, and a second section configured to surround the first section, the first section configured to comprise a first release strain energy rate that differs from a second release strain energy rate comprised by the second section.

2. The patch of claim 1, wherein:
    the laminate patch comprises a plurality of composite plies, each ply comprised by the plurality of composite plies comprising a respective fiber orientation, and
    the plurality of composite plies in the first region comprising characteristics different from characteristics of the plurality of composite plies in the second region.

3. The patch of claim 2, wherein the characteristics include at least one of:
    a characteristic of fibers in the plies;
    a thickness of the plies;
    a number of the plies;
    a presence of a gap between the plies;
    a material placed between the plies;
    an element placed between the plies;
    a structure placed between the plies;
    a type of a matrix comprising each ply;
    a density of the matrix comprising each ply;
    a fiber orientation of the plies; and
    a sequence of fiber orientations of the plies in the region.

4. The patch of claim 1, further comprising:
    the first section configured to underlie and be substantially coextensive with the first region, and thereby form the first control region;
    and
    an interlaminar fracture toughness comprised by the second region being greater than the interlaminar fracture toughness of the first region.

5. The patch of claim 1, wherein:
    the first section configured to underlie and be substantially coextensive with the first region, and thereby form the first control region;
    and
    an interlaminar fracture toughness comprised by the first region being greater than the interlaminar fracture toughness of the second region.

6. The patch of claim 1, wherein the patch includes a third control region comprising a strain energy release rate different than: a strain energy release rate comprised by the first control region, and a strain energy rate comprised by the second control region.

7. The patch of claim 6, wherein:
    the third control region surrounds the second control region.

8. The patch of claim 1, wherein:
    the patch includes a plurality of fiber reinforced composite laminate plies, and
    at least one ply in the first region extends into the second region.

9. The patch of claim 1, wherein the layer of adhesive further comprises:
    a characteristic comprised by the first region being tailored to a property comprised by the first section; and
    a characteristic comprised by the second region being tailored to a property comprised by the second section.

10. A rework patch adapted to be adhesively bonded to a composite structure over an area containing inconsistencies, the rework patch comprising:
    a composite;
    a plurality of laminated composite plies comprising multiple regions of differing interlaminar fracture toughness configured to control changes in a condition of the patch;
    a layer of adhesive configured to bond the rework patch to a surface of the composite structure, the layer of adhesive comprising: a first section comprising a width greater than a width of the area containing inconsistencies, and a second section configured to surround the first section, each section tailored to release strain energy at respectively different rates;
    the rework patch configured to form a bond joint between the rework patch and the surface of the composite structure, and comprising: a first region configured to overlie and be substantially coextensive with the first section and form a first control region, and a second region configured to overlie and be substantially coextensive with the second section and form a second control region.

11. The rework patch of claim 10, further comprising:
    a third region and a third section, such that the third region substantially surrounds the second region, the third section substantially surrounds the second section, and the third region configured to overlie the third section and form a third control region.

12. The rework patch of claim 10, wherein:
    the multiple regions comprise a third region, the second region comprising an interlaminar fracture toughness greater than an interlaminar fracture toughness comprised by the third region, and the first region comprising an interlaminar fracture toughness greater than an interlaminar fracture toughness comprised by the second region.

13. The rework patch of claim 12, further comprising:
    the interlaminar fracture toughness comprised by the third region being between approximately 0.5 and 1 in-lbs/in$^2$, the interlaminar fracture toughness comprised by the second region being between approximately 1.5 and 2.0 in-lbs/in$^2$, and the interlaminar fracture toughness comprised by the first region being greater than approximately 2.5 in-lbs/in$^2$.

14. The rework patch of claim 10, wherein:
the multiple regions comprise a third region, the second region comprising an interlaminar fracture toughness greater than an interlaminar fracture toughness comprised by the first region, and the third region comprising an interlaminar fracture toughness greater than an interlaminar fracture toughness comprised by the second region.

15. The rework patch of claim 10, wherein:
each ply, comprising the plurality of laminated composite plies, comprises a fiber reinforcement comprising a fiber orientation, and the plurality of laminated composite plies within the multiple regions comprise differing sequences of fiber orientations.

16. The rework patch of claim 10, wherein at least one ply, comprising the plurality of laminated composite plies, comprised by one of the multiple regions comprises at least two sections respectively comprising fiber reinforcement comprising differing respective fiber orientations.

17. The rework patch of claim 10, wherein at least one ply, comprising the plurality of laminated composite plies, extends across at least two of the multiple regions.

18. The patch of claim 1, wherein the adhesive layer comprises multiple sheets of an adhesive film, and the first section comprises a first thickness that differs from a second thickness comprised by the second section.

19. The rework patch of claim 10, wherein surface surrounds an unscarfed inconsistent area.

20. The rework patch of claim 10, further comprising the first control region and the second control region being configured to facilitate: prediction of a course of a disbond extension, and an assessment of the condition of the rework patch through visual inspection of the rework patch.

* * * * *